June 24, 1958 — W. H. STEVENS — 2,839,785
FILM ADVANCING ROLL
Filed Nov. 10, 1953
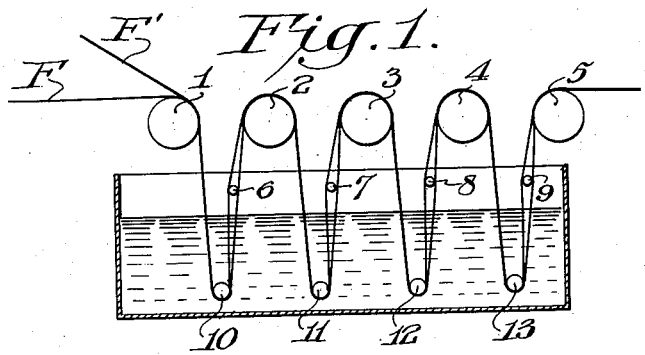
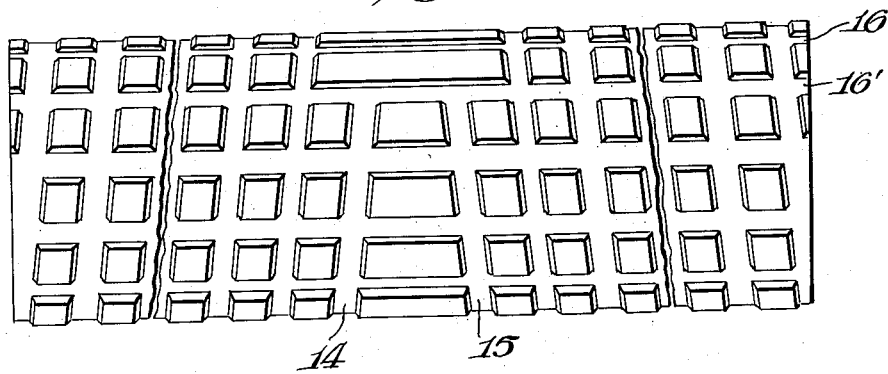
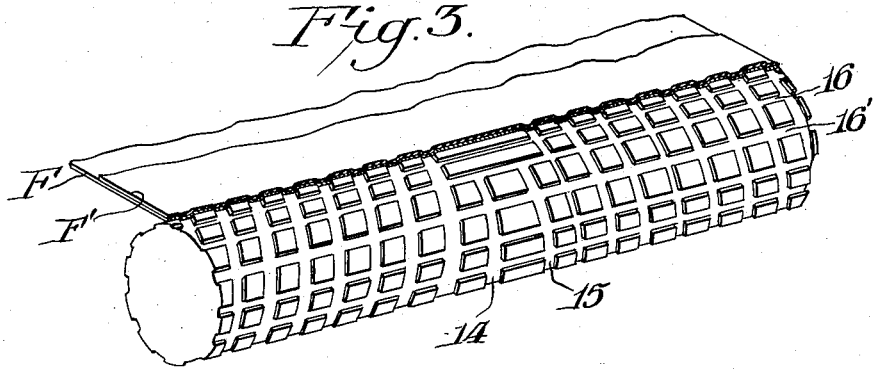
INVENTOR
William Henry Stevens
BY
ATTORNEY

United States Patent Office 2,839,785
Patented June 24, 1958

2,839,785

FILM ADVANCING ROLL

William Henry Stevens, Nashville, Tenn., assignor to E. I. du Pont de Nemours and Company, Wilmington, Del., a corporation of Delaware Application November 10, 1953, Serial No. 391,345

2 Claims. (Cl. 18—15)

This invention relates to apparatus for simultaneously advancing and guiding a multiplicity of superimposed films. More particularly, it relates to apparatus for simultaneously guiding and advancing a multiplicity of superimposed continuous films of gel regenerated cellulose.

In the simultaneous manufacturing of two or more films of regenerated cellulose in the same casting machine, the films in the wet or gel state are superimposed at many locations in the machine, particularly when bridging, i. e., passing from one tank to another tank of the machine. At economical operating speeds, the top film sways excessively, i. e., it does not track properly with the bottom sheet over the advancing rolls, and runs toward the side of the machine, causing serious operating difficulties, e. g., excessive wrinkling, jamming and breaking.

An object of this invention is to provide means for inhibiting sway of the top superimposed film in the simultaneous manufacture of a plurality of continuous films of regenerated cellulose in a single casting machine. Another object is to provide a film advancing roll effective to retard sway of continuous film of gel regenerated cellulose passing thereover. These and other objects will more clearly appear hereinafter.

These objects are realized by the present invention which, briefly stated, comprises a film advancing roll having twin spiral, surface grooves of equal and opposite pitch, each leading from a point midway from the ends of said roll and extending toward opposite ends of said roll, and a plurality of straight grooves parallel to the axis of the roll and spaced about the circumference thereof, the grooves being sufficiently wide and deep to permit some deformation thereon of the wet gel films on the roll and having sloped or rounded sides to prevent undue marking of the films.

A preferred embodiment of the invention will now be described with reference to the accompanying drawing wherein:

Figure 1 is a diagrammatic view of one tank in the wet end of a typical casting machine and is illustrative of an application of the present film advancing roll construction;

Figure 2 is a top view of a film advancing roll embodying the features of this invention; and Figure 3 is a perspective view of the roll of Figure 2, with superimposed sheets of film (in section) passing thereover.

Referring to Figure 1, two continuous gel films, F and F', of regenerated cellulose are advanced simultaneously by positively driven advancing roll 1 into a tank T in the wet end of a conventional casting machine, and then are passed in sequence under a guide member 10 in the tank (which may be a roll or a stationary rod), driven over advancing roll 2 out of the tank, under guide member 11 in the tank, and similarly around the remaining driven advancing rolls 3, 4 and 5 and the guide members 12 and 13. Separator rods 6, 7, 8 and 9 are interposed between the two films after every pass through the tank.

Of the machine elements described, the present invention is concerned with improvements in the positively driven advancing rolls 1, 2, etc.; for it is at these points in the operation that the greatest difficulty with film sway is encountered.

Referring now to Figures 2 and 3, the advancing roll is, in accordance with this invention, provided with twin spiral surface grooves 14 and 15 which are of equal and opposite pitch leading from a point midway from the ends of the roll. The roll is further provided with a plurality of straight surface grooves 16, 16', etc., parallel to the longitudinal axis of the roll and uniformly distributed about the circumference thereof. The spiral grooves and the straight grooves together thus define on the surface of the roll a plurality of relatively large treads, each having substantially the shape of the frustum of a quadrilateral (parallelogram) pyramid. These treads are hereinafter referred to as parallelogram roll treads. It is to be understood that the group may extend to the ends of the roll as shown or may terminate short of the extremities of the roll.

A critical requirement is that the spiral grooves must be sufficiently wide and deep to permit some deformation of the wet gel films into the grooves. This is contrary to the general practice, in designing treaded roll surfaces for regenerated cellulose films and similar soft, easily marked films, of limiting grooves to such narrow width as to effectively prevent such marked deformation. Moreover, it is requisite that the combination of spiral and straight grooves be employed. Spiral grooves alone mark the film badly. Longitudinal grooves alone are not effective in preventing film sway. The critical combination of the spiral grooves of equal and opposite pitch and the straight grooves parallel to the roll axis results in a form which gives the required traction and reduction in film sway without marking the films. The surface of the treads may be smooth or patterned. The edges of the treads, i. e., the side walls of the grooves, should be sloped or rounded to prevent marking the gel film.

Typical dimensions of this parallelogram roll tread and operable limits expressed in terms of the outside roll diameter (D) are given in the following table:

| | Minimum | Maximum | Preferred |
|---|---|---|---|
| Roll O. D (D)[1] | 3" | 12" | 4.5". |
| Depth of all grooves | 0.0139D | 0.020D | 0.0174D. |
| Longitudinal Grooves: | | | |
| Width at top | 0.058D | 0.230D | 0.115D. |
| Width at bottom | 0.056D | Same as width at top. | 0.112D. |
| Spiral Grooves: | | | |
| Width at top | 0.051D | 0.204D | 0.102D. |
| Width at bottom | 0.049D | Same as width at top. | 0.098D. |
| Angle between spiral groove and roll axis. | 63° 26' | Nearly 90° | 83° 40'. |
| Lead of spiral groove | 0.01D | 1.0D | 0.222D. |
| Parallelogram Dimensions: | | | |
| Parallel to Longitudinal Grooves— | | | |
| Top | (2) | (2) | 0.120D. |
| Bottom | (2) | (2) | 0.124D. |
| Parallel to Spiral Grooves— | | | |
| Top | (2) | (2) | 0.147D. |
| Bottom | (2) | (2) | 0.150D. |
| Top and bottom edges of parallelogram treads are rounded off to a radius of approximately | | | 0.0104D. |

[1] The outside roll diameter may vary from 3" to 12", with the above listed specifications applicable to all diameters.
[2] These parallelogram dimensions would depend on the choice of lead and the resulting angle between spiral groove and roll axis, and the selected groove widths.

It is to be understood, of course, that the improved advancing roll above described with reference to a single tank is similarly applicable to all tanks of the casting machine, or, in fact, wherever it is desired to advance or guide a plurality of wet films simultaneously by means of a single roll.

In addition to effectively inhibiting sway of superimposed films as herein described, the apparatus of this invention is of further advantage in the simultaneous manufacture of a plurality of films in a single casting machine in that it facilitates the removal of gas which tends to accumulate in pockets between the films, particularly in the early stages of the manufacture.

I claim:

1. In apparatus for the simultaneous multisheet casting of regenerated cellulose film comprising in combination a plurality of tanks containing treating fluids and rotatably mounted, positively driven, cylindrical film advancing rolls over which a plurality of superimposed wet regenerated cellulose films pass into and out of said tanks, the improvement which comprises as the film advancing rolls in said combination rolls each having two spiral surface grooves of equal and opposite pitch, each spiral groove leading from a point midway from the ends of said roll and extending toward opposite ends of said roll and a plurality of straight surface grooves parallel to the longitudinal axis of said roll and spaced about the circumference thereof, the grooves being sufficiently wide and deep to permit deformation therein of wet films on said roll.

2. The apparatus of claim 1 wherein the straight grooves are equally spaced around the circumference of said roll, and the side walls of all grooves are sloped whereby to inhibit marking of the film.

References Cited in the file of this patent

UNITED STATES PATENTS

| | | |
|---|---|---|
| 1,243,808 | Caffrey | Oct. 23, 1917 |
| 1,786,190 | Busch | Dec. 23, 1930 |
| 2,162,279 | Herchenrider | June 13, 1939 |
| 2,309,609 | Brandenberger et al. | Jan. 26, 1943 |
| 2,494,951 | Lindquist | Jan. 17, 1950 |

FOREIGN PATENTS

| | | |
|---|---|---|
| 583,543 | Germany | Aug. 24, 1933 |